United States Patent [19]

Chen, Sr. et al.

[11] Patent Number: 5,308,909
[45] Date of Patent: * May 3, 1994

[54] GLASS BUBBLE FILLED POLYBENZIMIDAZOLE

[75] Inventors: Paul N. Chen, Sr., Gillette; Victor C. Astone, Union; William M. Cooper, Clinton; O. Richard Hughes, Chatham Township, all of N.J.

[73] Assignee: Hoechst Celanese Corp, Somerville, N.J.

[*] Notice: The portion of the term of this patent subsequent to Jul. 20, 2010 has been disclaimed.

[21] Appl. No.: 19,960

[22] Filed: Feb. 19, 1993

Related U.S. Application Data

[63] Continuation-in-part of Ser. No. 713,942, Jun. 12, 1992, Pat. No. 5,229,448.

[51] Int. Cl.$^5$ .............................................. C08K 3/40
[52] U.S. Cl. ..................................... 524/494; 523/219
[58] Field of Search ........................ 524/494; 523/219

[56] References Cited

U.S. PATENT DOCUMENTS

| | | |
|---|---|---|
| 4,077,922 | 3/1978 | Farrissey, Jr. et al. ............ 523/219 |
| 4,353,998 | 10/1982 | Gagliani et al. .................... 523/219 |
| 4,618,525 | 10/1986 | Chamberlain et al. ............ 523/219 |
| 4,628,067 | 12/1986 | Chen, Sr. ............................. 521/25 |
| 4,692,480 | 9/1987 | Takahashi et al. ................. 523/219 |
| 4,745,139 | 5/1988 | Haasl et al. ......................... 523/219 |
| 4,837,251 | 6/1989 | Okey et al. ......................... 523/219 |
| 5,229,448 | 7/1993 | Cooper ............................... 524/494 |

OTHER PUBLICATIONS

*Encyclopedia of Polymer Science and Engineering*, Mark, Bikales, Overberger, & Menges, Eds., 2d Ed., vol. 7, pp. 53–73, John Wiley & Sons, Inc., 1987.

Primary Examiner—Kriellion S. Morgan
Attorney, Agent, or Firm—Joseph M. Mazzarese

[57] ABSTRACT

A moldable hollow glass filled PBI composition. The composition may be prepared by making a well-mixed slurry of glass microspheres in a solution of PBI in a suitable solvent, and then spinning the slurry through a jet or die under pressure and into a water bath where the particles coagulate. The solvent dissolves in the water, allowing solvent-free PBI-glass composite particles to be isolated.

12 Claims, No Drawings

GLASS BUBBLE FILLED POLYBENZIMIDAZOLE

This application is a continuation-in-part of copending patent application Ser. No. 713,942 filed Jun. 12, 1991, now U.S. Pat. No. 5,229,448.

BACKGROUND OF THE INVENTION

This invention relates to filled polymers, particularly to a polybenzimidazole ("PBI") filled with glass bubbles or balloons.

Polymers are used to make a multitude of products, including a wide variety of molded articles. These molded articles often must have specific attributes that may not be provided by unfilled polymers. In such cases, it may be desirable to use polymers filled with materials such as graphite powder, chopped glass, mica flakes, carbon fibers, glass fibers, metallic powders, or other fillers. The filler may advantageously alter the mechanical or thermal properties of the polymer. Filled polymers also may be used to reduce costs, or for other reasons.

A variety of filled polymers are known in the art. For example, polyesters may be filled with talc or hollow glass spheres (i.e., glass bubbles) to improve thermal or mechanical properties, thermoplastics may be filled with metallic powders to produce thermally or electrically conductive articles, and ground silica may be used in polyurethanes to form potting compounds having favorable dielectric properties. See: *Encyclopedia of Polymer Science and Engineering*, Mark, Bikales, Overberger, & Menges, Eds., 2d Ed., Vol. 7, pp. 53–73, John Wiley & Sons, Inc., 1987.

Generally, the polymer to be filled is one that is easily melt processible so that it will readily flow around the filler particles during molding to produce an article having a relatively uniform composition. The ability of such polymers to completely surround the filler material minimizes potentially detrimental voids and heterogenous areas within the article.

Thermally intractable or infusible polymers such as PBI are not amenable to melt processing with filler materials. Although these polymers generally may be hot-pressed or cold-pressed and sintered by compression molding techniques, it is difficult to use these polymers to make filled molded articles because the polymer does not melt and flow around the filler particles.

Hollow glass bubbles, sometimes called glass spheres or microspheres, or glass balloons, may be made in a variety of sizes and densities. The outer diameter of the bubble, and the thickness of the glass bubble wall, determines the volume of air (or vacuum) inside the bubble, and therefore its density. The air (or vacuum) inside the hollow glass bubble also reduces the thermal conductivity of the glass. Glass bubbles of various densities (e.g., 0.2–0.6 g/cm$^3$) and sizes (e.g., about 30–50 microns in diameter) are commercially available (e.g., SCOTCHLITE TM glass bubbles from 3M Corporation, having its headquarters in Minnesota).

SUMMARY OF THE INVENTION

The present invention is a moldable composition comprising glass bubble filled PBI. The glass bubbles preferably comprise at least about 10% by volume of the filled polymer.

It is an object of the present invention to provide a moldable hollow glass filled PBI powder.

It is also an object of the present invention to provide a composition comprising glass and PBI that has relatively low density, is relatively inexpensive, and has low thermal conductivity.

It is another object of the present invention to provide a high temperature resistant moldable composition.

It is a further object of the present invention to provide a moldable filled PBI powder and articles made therefrom.

These and other objects of the present invention will be apparent to those skilled in the art from the description of the invention contained herein.

DETAILED DESCRIPTION OF THE PREFERRED EMBODIMENTS

In one embodiment of the present invention, a 12% PBI solution in N,N-dimethylacetamide ("DMAC") is prepared and a sufficient amount of glass bubbles are added to produce a slurry having a weight ratio of PBI:glass bubbles in the range of between about 95:5 and about 45:55. The slurry is mixed mechanically to produce a fairly uniform dispersion and then is pumped under pressure into an approximately 100 micron spinning jet or die which produces droplets that are coagulated in a water bath. DMAC is miscible with water, but PBI and glass are insoluble in water, so the DMAC dissolves, leaving PBI-glass particles. These wet particles are collected, and then washed with hot water (about 90° C.), preferably three times for a total of 20 hours. The end result is an approximately spherical PBI-glass bubble composite particle free of DMAC (i.e., no more than about 0.1% DMAC by weight). The size of these composite particles varies, but they are typically in the approximate range of 100–150 microns.

Alternatively, the filled molding powders of the present invention may be made preparing a slurry as described above, followed by precipitation of the polymer. The polymer coats the filler particles as it precipitates. Precipitation may be induced by combining the slurry with water or other liquid immiscible with the DMAC during agitation, or by other means.

The glass filled-PBI composite powder of the present invention may be molded by any means known in the art. Typically, the powder is sintered, i.e. hot compression molded, at about 400°–500° C., preferably about 425°–475° C., for from about 5 minutes to about 3 hours. Preferably, the sintering time is from about 15 minutes to about 2 hours, more preferably from about 15 minutes to about 30 minutes. Longer sintering times may be used (e.g., up to 6 hours or more) but this may cause some deterioration in the mechanical properties of the final product; furthermore, such long compression molding periods are not necessary to make a well-integrated molding article.

Any suitable solvent or solvent mixture may be used to form the PBI solution, although DMAC is a preferred solvent in the processes described above. Those skilled in the art will be able to identify suitable solvents.

Other suitable methods not described herein may also be used to produce the composite of the present invention.

The preferred polybenzimidazole, poly[2,2,-(m-phenylene)-5,5'-bibenzimidazole], is made by the Hoechst Celanese Corporation (Charlotte, N.C.). Polybenzimidazoles are a class of linear polymers having repeat units containing the benzimidazole moiety:

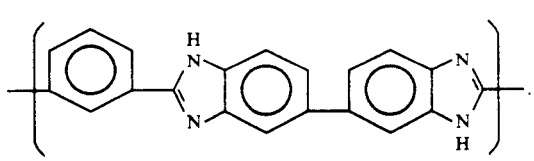

These compounds are nonflammable and may be formed into fibers, films, and membranes having outstanding thermal, physical, and chemical stability. Processes for their production are disclosed, for example, in U.S. Reissue Pat. No. 26,065 and U.S. Pat. Nos. 3,313,783, 3,509,108, 3,555,389, 3,433,772, 3,408,336, 3,549,603, 3,708,439, 4,154,919, and 4,312,976, the disclosures of which are herein incorporated by reference.

Polybenzimidazoles are prepared conventionally by the condensation of tetraamino compounds with dicarboxylic acids (or esters or halide salts thereof). For example, poly[2,2'-(m-phenylene)-5,5=-bibenzimidazole] may be prepared by reacting diphenyl isophthalate with 3,3',4,4'-tetraaminobiphenyl:

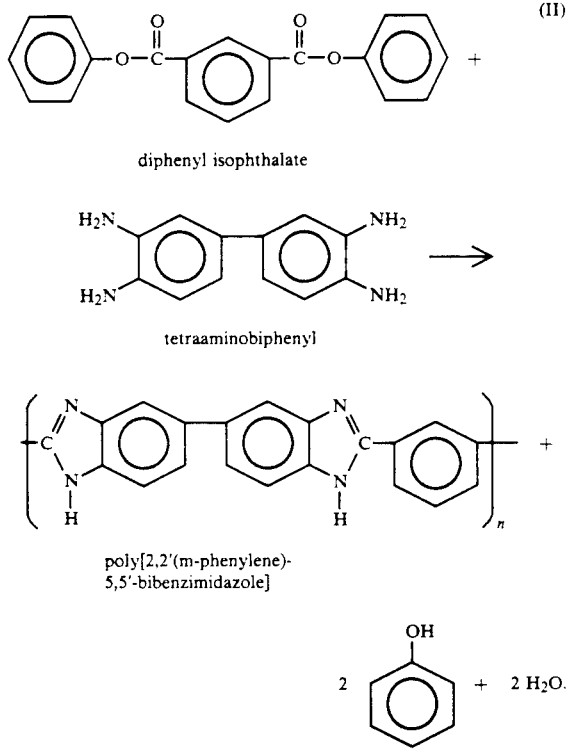

More generally, U.S. Pat. No. 2,895,948 teaches the following condensation reaction for making polybenzimidazole:

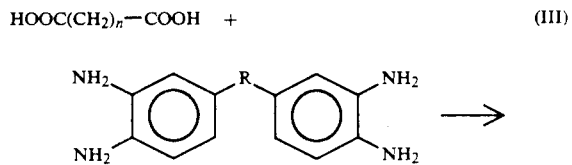

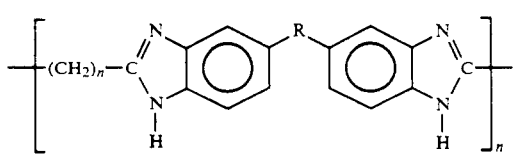

wherein R is a group selected from the class consisting of diphenyl bonds and divalent radicals, and n is an integer from 4 to 8. Other examples of conventional processes are disclosed in U.S. Pat. Nos. 4,814,530, 4,431,796, and 4,414,383.

The polymerization of PBI may be accomplished in several ways, such as in polyphosphoric acid or a hot molten nonsolvent such as sulfolane or diphenyl sulfone. Melt solid state polymerization is the commercially practical route.

The glass bubbles used in the present invention may vary in size, density and other properties, depending on the specifically desired attributes of the PBI-glass composite composition. Typically, the glass bubbles of the present invention are about 30-50 microns in diameter and have a density of about 0.3-0.6 g/cm$^3$. The glass bubbles preferably comprise at least about 10% by volume of the filled PBI composite composition, more preferably about 10-70% by volume, and still more preferably about 20-50% by volume.

The amount of glass bubbles in the composition is limited only to the extent that the composition must contain sufficient PBI to make it moldable into useful articles. The amount of glass may also be reduced as low as is desired; however, if less than 10% by volume is used the glass will have much less effect on the properties of the composition.

A higher percentage of hollow glass relative to PBI generally provides a composition that is cheaper, less dense, has a lower thermal conductivity, and perhaps has somewhat better high temperature resistance. These advantages are further enhanced by using glass bubbles having a lower density, i.e., in which a larger percentage of the bubble volume occupied by the hollow bubble interior. A higher percentage of PBI, on the other hand, tends to produce a composition with higher tensile properties.

The density of the glass bubbles cannot be reduced to the point that the bubble is easily crushed during processing as, for example, when the composition is molded. Crushed bubbles essentially become solid pieces of glass and lack the advantageous hollow interior. The amount of crush resistance that the glass bubbles require will depend upon the processing contemplated; those skilled in the art readily may determine which glass bubbles are appropriate in specific circumstances. Typically, the glass bubbles of the present invention can resist pressures of up to about 1-6 ksi without crushing.

The composition of the present invention may also include components other than hollow glass and PBI, if desired, provided that such components are compatible with the materials of the composition and will not interfere with the formation of a molded article. However, additional materials are not needed; for example, no binders, adhesives, compatibilizers or other additives are necessary to make a molded article according to this invention.

Although the present invention has been referred to herein as a filled powder, the invention should not be deemed limited to forming a particle having a particular size or shape; the term "powder" in this context refers broadly to any particles formed by the process of this invention, whether in the form of flakes, beads, fine powders, nodules, or other particles.

The following Examples are presented for the purpose of illustrating the invention; however, it is understood that the invention is not limited to the embodiments illustrated.

In the following examples, the term "PBI" refers specifically to the polymer poly[2,2'-(m-phenylene)-5,5'-bibenzimidazole] having an inherent viscosity of 0.4–0.6 g/dl in concentrated sulfuric acid.

EXAMPLE I

A solution of 12% PBI in DMAC (2% LiCl) was prepared using 670.1 grams of PBI. 35.3 grams of SCOTCHLITE TM S-60 glass bubbles were mixed into the PBI solution using a high shear homogenizer for 40 minutes to form a slurry. The S-60 bubbles had an average density of about 0.60 g/cm$^3$, a crush resistance of up to about 6 ksi pressure, and an average diameter of about 34 microns.

The slurry was atomized using a jet/wet spray (100 micron orifice) into a water bath. Beads formed in the bath; the beads were collected and washed in water at 90° C. for 12 hours, then washed two more times for one hour each in water at 90° C.

The washed beads were DMAC-free and contained 10% hollow glass bubbles by volume.

COMPARATIVE EXAMPLE

For comparison, moldable PBI containing no hollow glass (0%) was made according to the procedure of Ex. I (except no glass was mixed with the PBI solution). This composition provided a basis for evaluating the effect of the hollow glass on the properties of compositions of the present invention.

EXAMPLE II

A slurry was made as in Example I using 822.7 g PBI and 43.3 g SCOTCHLITE TM S-60 glass bubbles. The same procedure was followed as in Ex. I except that a mechanical stirrer was used to mix the slurry instead of the homogenizer. The result was DMAC-free beads containing PBI and hollow glass bubbles in a volume ratio of 90:10.

EXAMPLE III

A 12% PBI solution in DMAC was prepared from 768.2 g PBI and mixed with 85.4 g SCOTCHLITE TM S-60 glass bubbles to form a slurry by mechanically stirring for 2 hours. The slurry was atomized as in Ex. I, and entered a 1% DMAC-water bath in which beads formed. The beads were washed in water at 95° C. three times, first for 12 hours, then 2 hours and finally for 1 hour, and were then dried to produce a dry molding powder. The dry molding powder was 19.4% hollow glass by volume. Analysis indicated that the powder contained about 1% water and about 0.1% or less DMAC by weight.

EXAMPLE IV

A molding powder containing 35.1% hollow glass by volume was made from 749.1 g PBI and 187.3 g SCOTCHLITE TM S-60 glass bubbles according to the procedure of Ex. III.

EXAMPLE V

A molding powder containing 48.1% hollow glass by volume was made from 751.8 g PBI and 322.2 g SCOTCHLITE TM S-60 glass bubbles according to the procedure of Ex. III.

EXAMPLE VI

A molding powder containing 70% hollow glass by volume was made from 500.0 g PBI and 538.5 g SCOTCHLITE TM S-60 glass bubbles according to the procedure of Ex. III.

EXAMPLE VII

The compositions made in Examples II-VI and the Comparative Example were molded and sintered for 2 hours to produce test plaques of dimensions 4 inches × 4 inches x 0.12 inch. The sintering conditions and density of the test plaques are listed in Table Mechanical properties of these samples are given in Table 2; S=strength (in ksi), E=elongation (in %), and M=modulus (in msi). Thermal conductivities, in BTU-inch-hr$^{-1}$-ft$^{-2}$-°F.$^{-1}$, at various temperatures, for the 0%, 48% and 70% (v/v) glass-filled PBI are shown in Table 3. These data show that every increase in percent hollow glass produces an decrease in both density and thermal conductivity, and often also a decrease in some mechanical properties.

TABLE

| PBI Composition (Glass Vol. %) | Sintering Conditions (°F./ksi) | Density (g/cm$^3$) |
|---|---|---|
| 0 | 862/2 | 1.28 |
| 10 | 833/2 | 1.25 |
| 19 | 862/2 | 1.20 |
| 35 | 860/2 | 1.15 |
| 48 | 860/0.5 | 0.94 |
| 70 | 862/0.5 | 0.81 |

TABLE 2

| PBI Compos. (Glass Vol %) | Tensile Prop. S/E/M | Flex S | Compressive S/M |
|---|---|---|---|
| 0 | 27.8/3.7/0.87 | 40.5 | 60/0.85 |
| 10 | 18.4/2.4/0.86 | 27.0 | 47/0.84 |
| 19 | 20.9/3.1/0.86 | 31.9 | 44/0.85 |
| 35 | 15.2/2.2/0.93 | 25.0 | 39/0.91 |
| 48 | 8.8/1.8/0.73 | 16.9 | 33/0.85 |
| 70 | 4.1/1.4/0.64 | 8.2 | 24/0.87 |

TABLE 3

| Temp. (°C.): | Thermal Conductivities Glass Vol. %: | | |
|---|---|---|---|
| | 0% | 48% | 70% |
| 25 | 2.27 | 2.01 | 1.74 |
| 100 | 2.57 | 2.18 | 2.00 |
| 200 | 2.88 | 2.29 | 2.08 |
| 300 | 2.96 | 2.40 | 2.17 |

Many variations of the present invention will be apparent to those skilled in the art from the above description and the appended Claims. The present invention includes all variations within the scope of the appended claims.

We claim:

1. A moldable composition comprising polybenzimidazole and glass bubbles, said glass bubbles comprising at least about 10% by volume of said composition.

2. A moldable composition according to claim 1 wherein said polybenzimidazole comprises poly[2,2,-(m-phenylene)-5,5,-bibenzimidazole].

3. A moldable composition according to claim 1 wherein said glass bubbles comprise about 20–50% by volume of said composition.

4. A moldable composition according to claim 1 wherein said glass bubbles have an average density of approximately 0.3–0.6 g/cm$^3$.

5. A moldable composition consisting essentially of polybenzimidazole and glass bubbles, wherein at least about 10% by volume of said composition consists of said glass bubbles.

6. A moldable composition according to claim 5 wherein said polybenzimidazole comprises poly[2,2'-(m-phenylene)-5,5'-bibenzimidazole].

7. A moldable composition according to claim 5 wherein about 20–50% by volume of said composition consists of said glass bubbles.

8. A moldable composition according to claim 7 wherein said polybenzimidazole is poly[2,2,-(m-phenylene)-5,5'-bibenzimidazole].

9. A moldable composition comprising poly[2,2'-(m-phenylene)-5,5'-bibenzimidazole] and about 10–70% by volume glass bubbles.

10. A moldable composition according to claim 9 wherein said glass bubbles have an average diameter of about 30–50 microns and an average density of about 0.3–0.6 g/cm$^3$.

11. A molded article comprising the composition of claim 10.

12. A molded article comprising the composition of claim 1.

* * * * *